United States Patent [19]

Kifer

[11] Patent Number: 5,415,457
[45] Date of Patent: May 16, 1995

[54] ITEM SUPPORTING ATTACHMENT ON A VEHICLE SEAT BACK

[75] Inventor: Harlan E. Kifer, Bloomfield Hills, Mich.

[73] Assignee: Chrysler Corporation, Highland Park, Mich.

[21] Appl. No.: 250,239

[22] Filed: May 27, 1994

[51] Int. Cl.6 .............................................. A47C 7/62
[52] U.S. Cl. ................................ 297/188.04; 224/275; 224/42.46 A
[58] Field of Search .................... 297/191, 188.04; 248/690, 692; 224/42.46 B, 275

[56] References Cited

U.S. PATENT DOCUMENTS

| 94,448 | 8/1869 | Simonson . | |
|---|---|---|---|
| 344,555 | 6/1886 | Wood . | |
| 462,723 | 11/1891 | Morss . | |
| 1,656,339 | 1/1928 | Runyan . | |
| 2,582,650 | 1/1952 | Patton | 224/275 X |
| 3,044,828 | 7/1962 | Fowler | 297/191 |
| 3,333,890 | 1/1967 | Whitwan | 297/191 |
| 3,479,085 | 11/1969 | Weinstein | 297/219 |
| 4,711,488 | 12/1987 | Ohanessian | 197/191 |
| 4,836,602 | 6/1989 | L'Almada Remedios et al. | 297/191 |
| 5,004,295 | 4/1991 | Inoue | 297/191 |

Primary Examiner—Peter R. Crown
Assistant Examiner—Anthony Barfield
Attorney, Agent, or Firm—Christopher Taravella

[57] ABSTRACT

An item supporting attachment, such as a plastic grocery bag retainer assembly, mounted on a vehicle seat back. The retainer assembly includes a back wall insert and an integrally mounted retainer sub-assembly. The sub-assembly includes a row of spaced-apart shopping bag mounting hooks formed on the outer side of the seat back, and suitable rows of mounting flanges extending through the seat back insert, with a retaining wire threaded through one of the rows of flanges.

12 Claims, 3 Drawing Sheets

ITEM SUPPORTING ATTACHMENT ON A VEHICLE SEAT BACK

TECHNICAL FIELD

This invention relates generally to item supporting attachments on the back of vehicle seats, and, more particularly to an integral plastic shipping bag retainer on the back of a rear seat of a vehicle, such as a rear-opening van.

BACKGROUND ART

Known attachments for mounting on the backs of seats include a triple opening type pocket, Inoue U.S. Pat. No. 5,004,295; a holder assembly in a recessed area in the back of a passenger seat, Remedios et al U.S. Pat. No. 4,836,602; a garment hanger, Ohanessian patent no. 4,711,488; a slip cover type of article carrier, Weinstein U.S. Pat. No. 3,479,085; a mounting panel with upwardly and rearwardly inclined arms, Fowler U.S. Pat. No. 3,044,828; a kit with stiffening rod, Runyan U.S. Pat. No. 1,656,339; a package holder, Morss U.S. Pat. No. 462,723; a hat holder, Wood U.S. Pat. No. 344,555; and a web of netting, Simonson U.S. Pat. No. 94,448.

DISCLOSURE OF THE INVENTION

A general object of the invention is to provide an improved integral item supporting attachment integrally formed on the rigid back wall insert of a vehicle seat back.

Another object of the invention is to provide an integral vehicle seat back item supporting attachment for supporting containers with handles thereon, such as filled plastic shopping bags.

A further object of the invention is to provide an integral vehicle seat back retainer type-attachment including a row of spaced-apart shopping bag mounting hooks formed on the outer side of the seat back, and at least one row of flanges extending through the seat back insert, with a retaining wire threaded through at least one row of flanges.

Still another object of the invention is to provide an integral vehicle seat back retainer assembly for supporting plastic grocery bags, wherein the retainer assembly includes a rigid seat back insert, and a retainer sub-assembly integrally mounted on the rigid seat back insert, with the retainer sub-assembly including an outer row of spaced-apart mounting hooks, two rows of openings formed through the rigid seat back insert, an inner row of mounting flanges extending through one row of openings, a wire retainer fastener threaded through the mounting flanges, and another inner row of support flanges extending through the other row of openings, and suitable retention members on the rigid insert to secure same to the vehicle seat back.

A still further object of the invention is to supplement the item supporting attachment with a holding net hanging from an elastic cord slipped over the mounting hooks of the item supporting attachment.

These and other objects and advantages of the invention will become more apparent when reference is made to the following drawings and the accompanying description.

BRIEF DESCRIPTION OF THE DRAWINGS

FIG. 6 is an enlarged fragmentary and exploded perspective view of the molded plastic portion and an adjacent vehicle seat back.

BEST MODE FOR CARRYING OUT THE INVENTION

Figure 1:
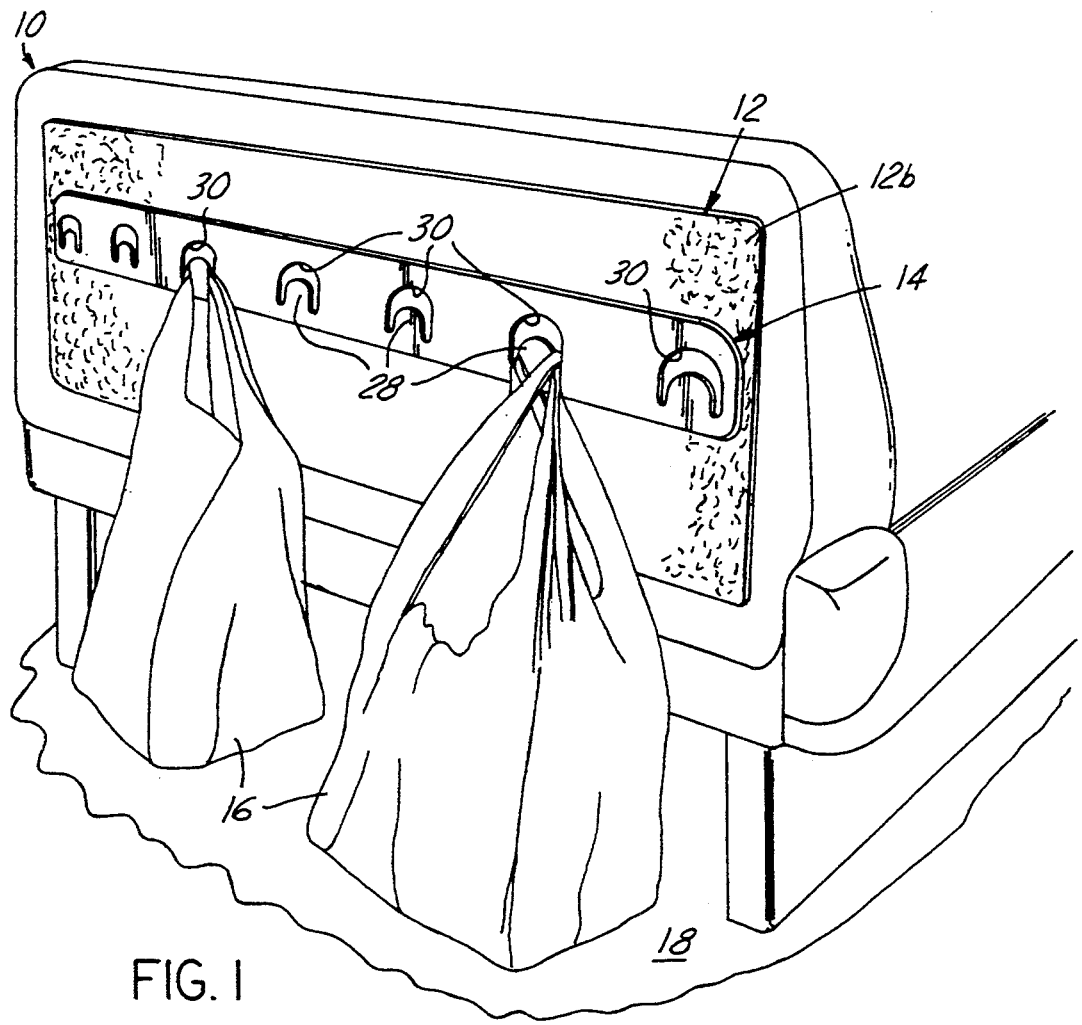
FIG. 1 is a perspective fragmentary view of the back of a vehicle seat embodying the invention.

Referring now to the drawings in greater detail, FIG. 1 illustrates generally a vehicle seat back 10 having a rigid back wall insert 12, consisting of a board 12a covered by an outer carpet 12b, on which a multiple bag retainer sub-assembly 14 is integrally mounted for supporting plastic shopping bags 16 in an upright position with the bottoms thereof sitting on a vehicle floor 18.

Figure 2:
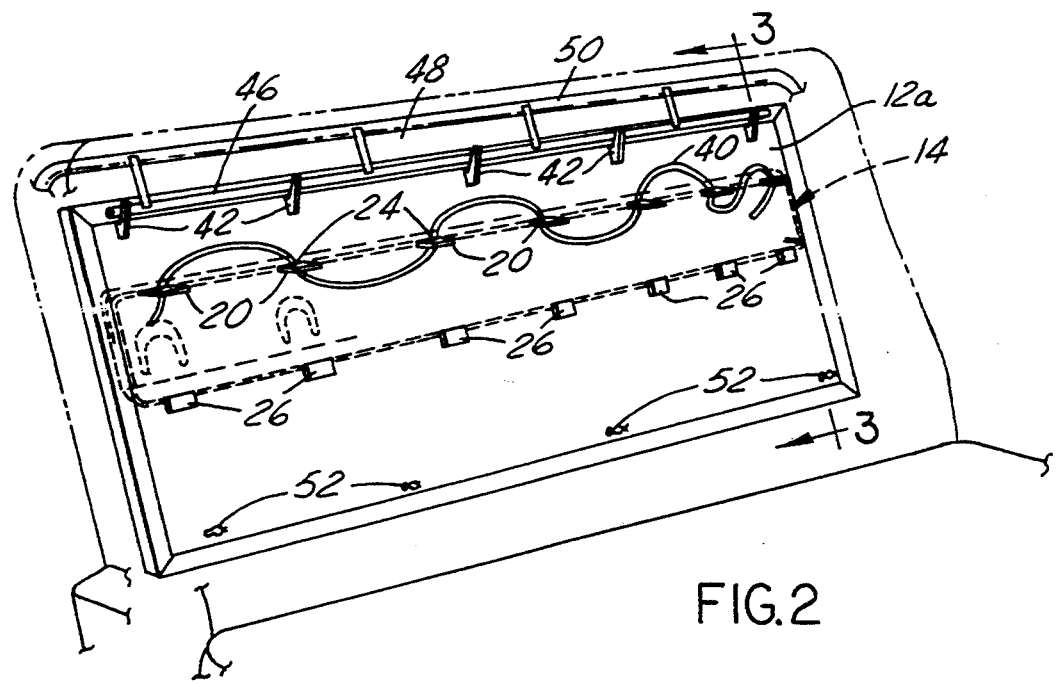
FIG. 2 is a fragmentary view of the inside wall portion of the back of the FIG. 1 vehicle seat embodying the invention.
Figure 3:
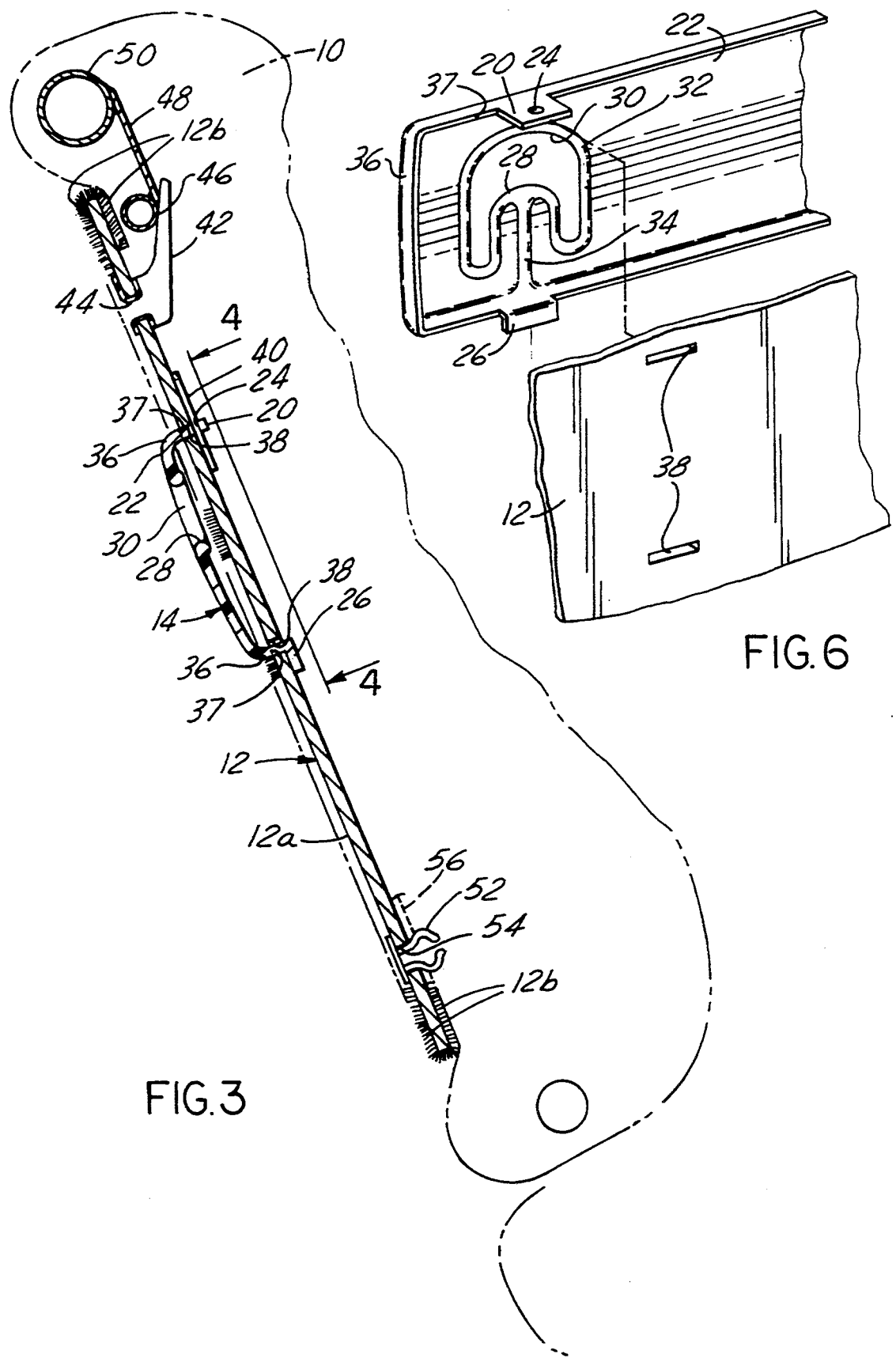
FIG. 3 is an enlarged cross-sectional view taken along the plane of the line 3—3 of FIG. 2, and looking in the direction of the arrows.

As shown more specifically in FIGS. 2 and 3, the inside of the rigid back wall insert 12 on which the retainer sub-assembly 14 is mounted has the following elements of the sub-assembly extending therethrough:

a first row of mounting or retaining flanges 20 extending perpendicularly from a front wall 22 (FIG. 1) of the sub-assembly 14, and having a hole 24 formed through each flange 20; and a second row of support flanges 26 extending perpendicularly from the front wall 22 through the rigid seat back wall insert 12 and then downwardly along the inner surface of the back wall.

The sub-assembly 14 may be formed as a plastic molded piece.

Figure 4:
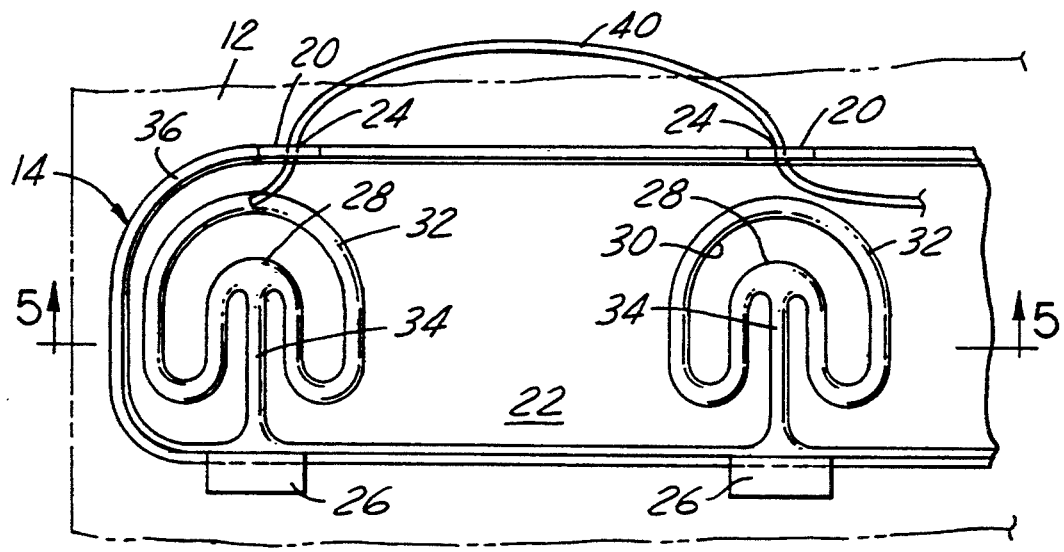
FIG. 4 is a fragmentary view taken along the plane of the line 4—4 of FIG. 3, and looking in the direction of the arrows.
Figure 5:
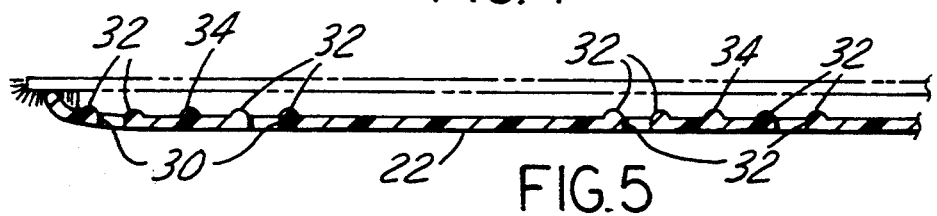
FIG. 5 is a cross-sectional view taken along the plane of the line 5—5 of FIG. 4, and looking in the direction of the arrows.

As shown in FIGS. 1 and 3, a row of bag mounting hooks 28 are formed in the front wall 22 of the sub-assembly 14 by virtue of an inverted U-shaped opening 30 being cut out of the front wall. As shown in FIGS. 4, 5 and 6, a reinforcing bead 32 is formed around the inner edge of each opening 30, and a straight reinforcing bead 34 is formed on the center line of the inner surface of each mounting hook 28.

As shown best in FIG. 6, a peripheral flange 36 is formed around the front wall 22, with the edge 37 thereof adapted to abut against the rigid back wall insert 12 of the seat back 10, as shown in FIG. 3. It is on the inner edge 37 of the flange 36 that the first and second rows of flanges 20 and 26 are formed, as shown in FIG. 6, to extend through a plurality of slots 38 formed in the rigid back wall 12.

As shown in FIGS. 2 and 4, a retaining wire 40 is threaded through the holes 24 of the respective flanges 20 along the inner surface of the rigid back wall insert 12.

Referring to FIGS. 2 and 3, an upper row of hooks 42 are mounted in openings 44 in the board 12a, and extend upwardly around a laterally extending rod 46 secured at the lower end of a flat plate 48 secured at its upper end to a seat frame 50. A lower row of conventional mounting clips 52 extend through openings 54 formed in the board 12a of the rigid back wall insert 12, into an inner wall, represented as 56 (FIG. 3), of the seat back 10. The openings 44 and 54 are covered by the carpet 12b.

Figure 7:
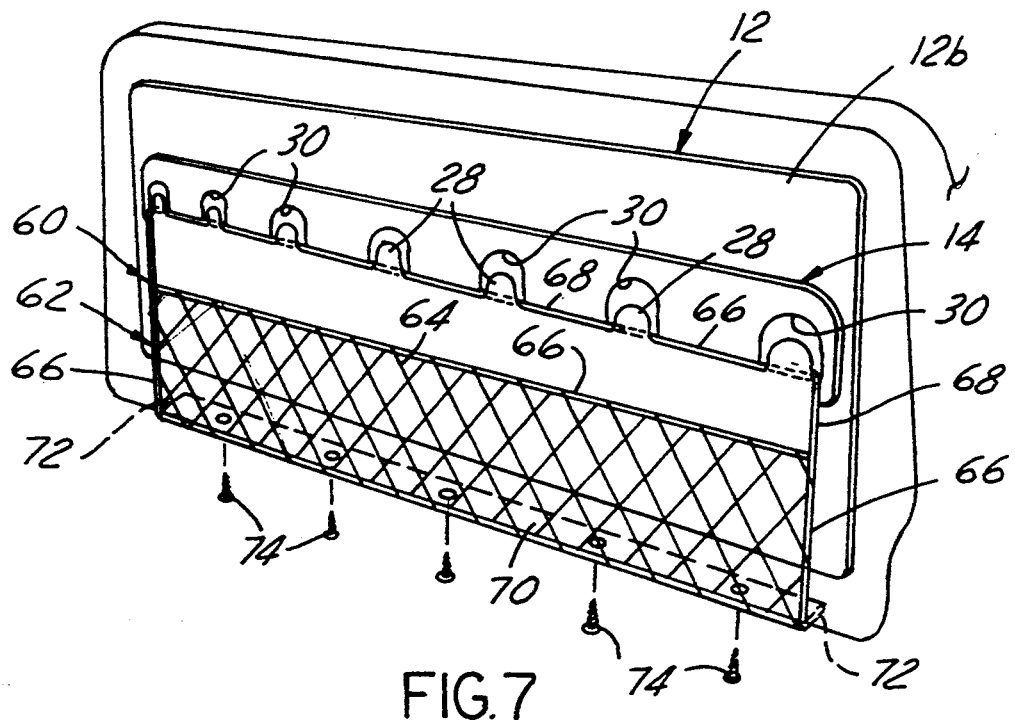
FIG. 7 is a perspective view similar to FIG. 1, with an additional optional holding device connected thereto.

Referring now to FIG. 7, there is shown an additional optional retainer unit 60 including a container 62 which may consist of a net or netting 64 connected around a strap 66 formed of an elastic cord. An upper extension 68 of the elastic cord 66 is adapted to be slipped over the mounting hooks 28 to support the container 62. A flat bottom piece 70 is secured between the oppositely disposed ends 72 of the strap 66. A plurality of fasteners, such as screws 74 serve to secure the bottom piece 70 to a lower portion of the seat frame 50.

Industrial Applicability

It should be apparent that the invention provides an improved integral rear van seat back mounting attachment for supporting items with carrying handles, particularly filled plastic shopping bags.

It should also be apparent that the integral seat back mounting attachment could include formed specific mounting devices other than the mounting hooks shown and described.

While but one embodiment of the invention has been shown and described, other modifications thereof are possible within the scope of the following claims.

What is claimed is:

1. An item supporting attachment for a vehicle seat back, the attachment comprising a rigid seat back insert, and a retainer sub-assembly integrally mounted on the rigid seat back insert, said retainer sub-assembly including a row of spaced-apart mounting hooks, a row of openings formed through said rigid seat back insert, a row of mounting flanges formed on said retainer sub-assembly and extended through said openings, and retaining fastener means for interconnecting said extended mounting flanges.

2. The item supporting attachment described in claim 1, and a second row of openings formed through said rigid seat back insert spaced apart from said first mentioned row of openings, and a row of support flanges formed on said retainer sub-assembly and extended through said second row of openings.

3. The item supporting attachment described in claim 2, wherein said support flanges extend inwardly through said second row of openings and downwardly along said rigid seat back insert.

4. The item supporting attachment described in claim 2, and a peripheral flange formed on said sub-assembly, with said mounting flanges and said support flanges formed on the edge of said peripheral flange.

5. The item supporting attachment described in claim 2, wherein said retainer sub-assembly is formed as a plastic molded piece.

6. The item supporting attachment described in claim 1, wherein each said mounting hook is formed by an inverted U-shaped opening through said retainer sub-assembly.

7. The item supporting attachment described in claim 6, and a reinforcing bead formed around each U-shaped opening.

8. The item supporting attachment described in claim 6, and a reinforcing bead formed on said mounting hook intermediate said U-shaped opening.

9. The item supporting attachment described in claim 1, wherein said retaining fastener means is a wire threaded through said extended mounting flanges.

10. The item supporting attachment described in claim 1, wherein said rigid seat back insert comprises a board and a carpet covering same, an upper row of up-turned hooks and a lower row of clips extended through said board to secure said retainer assembly to said vehicle seat back.

11. The item supporting attachment described in claim 1 and a container suspended by an elastic cord from said spaced-apart mounting hooks, and fastener means adapted to secure said container at the bottom thereof to said vehicle seat back.

12. The item supporting attachment described in claim 11, wherein said container consists of a net connected to the elastic cord.

* * * * *